(12) United States Patent
Schonberger et al.

(10) Patent No.: US 12,244,590 B2
(45) Date of Patent: Mar. 4, 2025

(54) ACCESS AUTHENTICATION USING OBFUSCATED BIOMETRICS (71) Applicant: Microsoft Technology Licensing, LLC, Redmond, WA (US)

(72) Inventors: Johannes Lutz Schonberger, Zurich (CH); Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 17/997,081

(22) PCT Filed: Apr. 21, 2021

(86) PCT No.: PCT/US2021/070439
§ 371 (c)(1),
(2) Date: Oct. 25, 2022

(87) PCT Pub. No.: WO2021/226615
PCT Pub. Date: Nov. 11, 2021

(65) Prior Publication Data
US 2023/0179596 A1    Jun. 8, 2023

(30) Foreign Application Priority Data
May 6, 2020    (NL) .................................... 2025515

(51) Int. Cl.
*H04L 9/40* (2022.01)
*H04L 9/32* (2006.01)

(52) U.S. Cl.
CPC .......... *H04L 63/0861* (2013.01); *H04L 63/10* (2013.01); *H04L 9/3231* (2013.01)

(58) Field of Classification Search
CPC ..... H04L 63/08; H04L 63/0861; H04L 63/10; H04L 63/12; H04L 9/32; H04L 9/3231;
(Continued)

(56) References Cited

U.S. PATENT DOCUMENTS

| 8,842,887 B2 | 9/2014 | Beatson et al. |
| 8,972,742 B2 | 3/2015 | Troncoso Pastoriza et al. |

(Continued)

FOREIGN PATENT DOCUMENTS

| CN | 108475309 A | 8/2018 |
| EP | 1706957 B1 | 8/2018 |

(Continued)

OTHER PUBLICATIONS

Abidin, Aysajan, "On Privacy-Preserving Biometric Authentication", In Proceedings of International Conference on Information Security and Cryptology, Mar. 3, 2017, pp. 169-186.
(Continued)

*Primary Examiner* — Shaqueal D Wade-Wright
(74) *Attorney, Agent, or Firm* — Alleman Hall & Tuttle LLP (57) ABSTRACT

A method for authorizing access to one or more secured computer resources includes obfuscating a reference biometric vector into an obfuscated reference biometric vector using a similarity-preserving obfuscation. An authentication biometric vector is obfuscated into an obfuscated authentication biometric vector using the similarity-preserving obfuscation. A similarity of the obfuscated authentication biometric vector and the obfuscated reference biometric vector is tested. Based on the similarity being within an authentication threshold, access to the one or more secured computer resources is authorized.

13 Claims, 7 Drawing Sheets

(58) Field of Classification Search
CPC ... H04L 9/3226; H04L 9/0662; H04L 9/0668; H04L 9/0866; H04L 9/0869; G06F 21/30; G06F 21/32

See application file for complete search history.

(56) References Cited

U.S. PATENT DOCUMENTS

| | | | |
|---|---|---|---|
| 9,665,704 B2 | 5/2017 | Beatson et al. | |
| 9,838,388 B2 | 12/2017 | Mather et al. | |
| 9,888,382 B2 | 2/2018 | Chung et al. | |
| 11,418,319 B2* | 8/2022 | Aharoni | H04L 9/008 |
| 11,777,736 B2* | 10/2023 | Blackhurst | H04L 9/008 |
| | | | 713/186 |
| 2011/0037563 A1 | 2/2011 | Choi et al. | |
| 2015/0186721 A1 | 7/2015 | Derakhshani | |
| 2015/0379250 A1 | 12/2015 | Saito et al. | |
| 2016/0119119 A1* | 4/2016 | Calapodescu | G06F 21/6227 |
| | | | 380/30 |
| 2019/0280868 A1 | 9/2019 | Streit | |
| 2020/0036749 A1 | 1/2020 | Ferres et al. | |
| 2020/0050794 A1 | 2/2020 | Hassan et al. | |
| 2020/0349247 A1* | 11/2020 | Seo | A61B 5/36 |
| 2021/0342432 A1* | 11/2021 | Goldwerger | G06F 21/32 |
| 2023/0370251 A1* | 11/2023 | Ikarashi | H04L 9/085 |

FOREIGN PATENT DOCUMENTS

| | | |
|---|---|---|
| JP | 2006158851 A | 6/2006 |
| JP | 2008129743 A | 6/2008 |
| JP | 2010034967 A | 2/2010 |
| JP | 2016114692 A | 6/2016 |
| RU | 2386220 C2 | 4/2010 |
| WO | 2019032301 A1 | 2/2019 |

OTHER PUBLICATIONS

Chun, et al., "Outsourceable Two-Party Privacy-Preserving Biometric Authentication", In Proceedings of the 9th ACM Symposium on Information, Computer and Communications Security, Jun. 4, 2014, pp. 401-412.

Lagendijk, et al., "Encrypted Signal Processing for Privacy Protection: Conveying the utility of homomorphic encryption and multiparty computation", In Journal of IEEE Signal Processing Magazine, vol. 30, Issue 1, Jan. 2013, pp. 82-105.

Maneesh, et al., "Efficient Biometric Verification in Encrypted Domain", In Book of International Conference on Biometrics, Jun. 2, 2009, pp. 899-908.

"Search Report and Written Opinion Issued in Netherlands Patent Application No. N2025515", Mailed Date: Feb. 19, 2021, 11 Pages.

"International Search Report and Written Opinion Issued in PCT Application No. PCT/US21/070439", Mailed Date: Aug. 13, 2021, 12 Pages.

Wang, et al., "An Analysis of Random Projection for Changeable and Privacy-Preserving Biometric Verification", In Journal of IEEE Transactions on Systems, Man, and Cybernetics, Part B Cybernetics, vol. 40, Issue 5, Oct. 2010, pp. 1280-1293.

Zhmoginov, et al., "Inverting face embeddings with convolutional neural networks", In Repository of arXiv: 1606.04189v2, Jul. 7, 2016, pp. 1-12.

Decision to Grant Received for Chinese Application No. 202180033165.7, mailed on Jul. 26, 2024, 04 pages (English Translation Provided).

First Office Action Received for Chinese Application No. 202180033165.7, mailed on Jun. 6, 2024, 8 pages. (English Translation Provided).

Gottemukkula, et al., "Enhanced Obfuscation for Multi-part Biometric Templates", IEEE Congress on Evolutionary Computation (CEC), Jul. 29, 2016, pp. 1394-1401.

Office Action Received for Russian Application No. 2022130824 mailed on Aug. 7, 2024, 22 pages. (English translation Provided).

Notice of reasons for refusal Received for Japanese Application No. 2022-560884, mailed on Dec. 19, 2024, 4 pages.

* cited by examiner

ACCESS AUTHENTICATION USING OBFUSCATED BIOMETRICS

CROSS REFERENCE TO RELATED APPLICATIONS

The present application is a U.S. National Phase of International Patent Application Serial No. PCT/US2021/070439 entitled "ACCESS AUTHENTICATION USING OBFUSCATED BIOMETRICS", filed Apr. 21, 2021, which claims priority to Netherlands Patent Application Serial No. 2025515, filed May 6, 2020, the entire contents of each of which are hereby incorporated by reference for all purposes.

BACKGROUND

Biometrics are commonly used as an authentication method for accessing secured computer resources. Example biometric authentication methods include facial recognition, voiceprint analysis, fingerprint recognition, and iris recognition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for authorizing access to one or more secured computer resources includes obfuscating a reference biometric vector into an obfuscated reference biometric vector using a similarity-preserving obfuscation. An authentication biometric vector is obfuscated into an obfuscated authentication biometric vector using the similarity-preserving obfuscation. A similarity of the obfuscated authentication biometric vector and the obfuscated reference biometric vector is tested. Based on the similarity being within an authentication threshold, access to the one or more secured computer resources is authorized.

DETAILED DESCRIPTION

As discussed above, biometric authentication is often used to authorize access to secured computer resources. An authentication biometric identifier sensed at a client computing device (e.g., a fingerprint or facial scan) may be transmitted to an authentication computing device for comparison to a previously measured reference biometric identifier—e.g., a different fingerprint or facial scan provided by a user during account creation. For example, the authentication computing device may be a network-accessible server that restricts access to computer resources (e.g., local machine login, local machine file access, local machine peripheral access, or cloud-based service access), only permitting a client computing device to access the otherwise restricted computer resource after successful biometric authentication.

Figure 1:
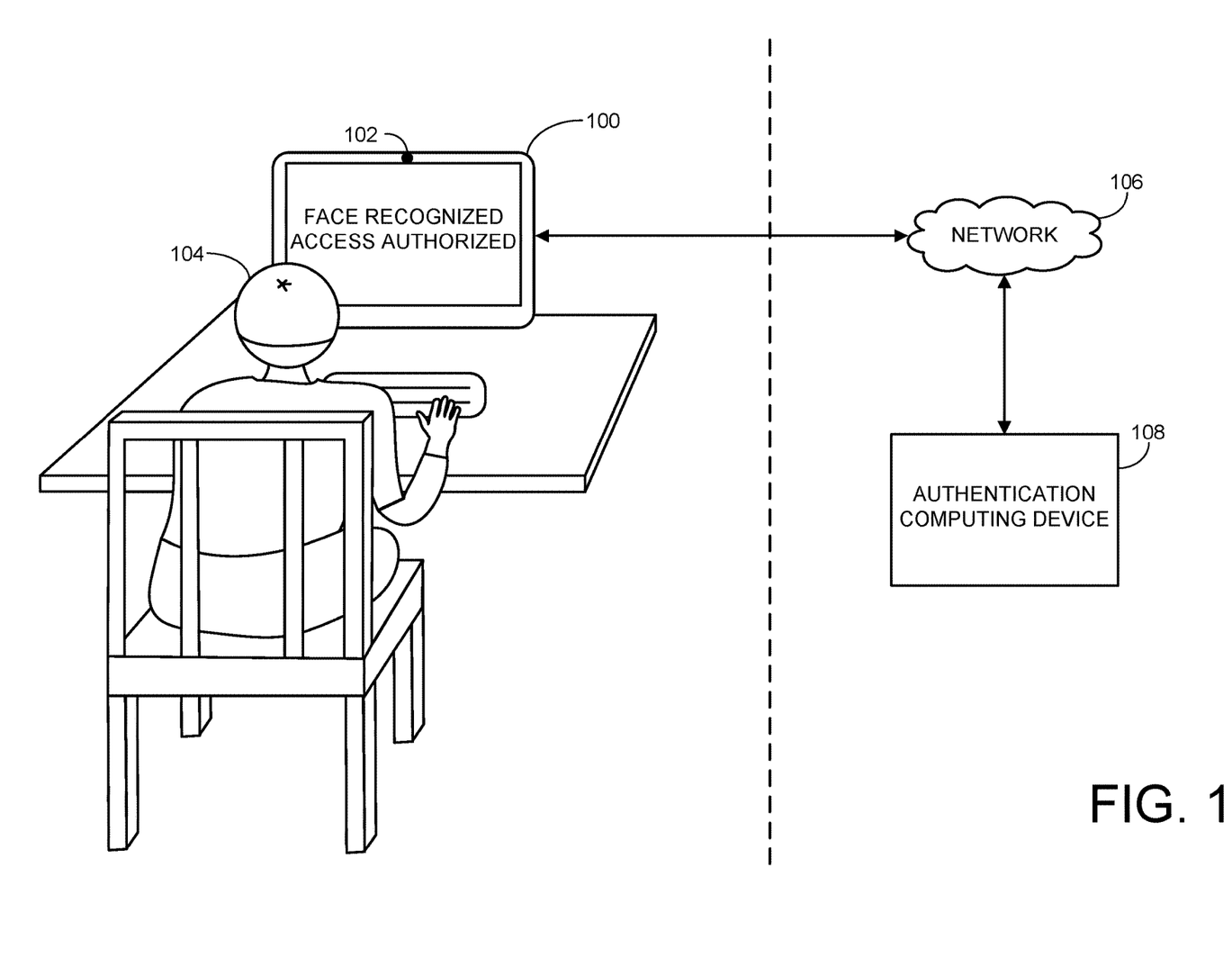
FIG. 1 schematically illustrates use of biometrics to authorize access to secured computer resources.

This scenario is schematically illustrated in FIG. 1, which shows an example client computing device 100 equipped with a biometric sensor 102. The biometric sensor is configured to sense a biometric identifier from a human user 104. In this example, the biometric sensor is a camera configured to capture an image of a face of the user. In other examples, other suitable biometric identifiers of a human user may be measured, as will be described in more detail below.

After biometric device 102 captures the authentication biometric vector (in this case, an image of the user's face), client computing device 100 transmits the authentication biometric identifier to an authentication computing device 108 via a network 106 (e.g., the Internet). After receiving the authentication biometric identifier, the authentication computing device compares the authentication biometric identifier to a stored reference biometric identifier, which is known to correspond to an authorized user. If the authentication biometric identifier matches the reference biometric identifier within an authentication threshold, the authentication computing device communicates an authentication authorization to the client computing device, authorizing access to the one or more secured computer resources.

However, safe and secure transmission and storage of biometric information is of paramount importance. Recognizing that malicious actors may attempt to intercept transmitted biometric information, or improperly access stored biometric information, the present disclosure describes techniques for authorizing access to one or more secured computer resources based on obfuscated biometric vectors. Specifically, a client computing device may measure an authentication biometric identifier, transform the biometric identifier into a biometric vector, and obfuscate the biometric vector using a similarity-preserving obfuscation prior to transmission to an authentication computing device. After receiving the obfuscated authentication biometric vector, the authentication computing device may test the similarity of the obfuscated authentication biometric vector and a previously-received obfuscated reference biometric vector. The similarity-preserving obfuscation mitigates the risk that the obfuscated vectors can be inverted to restore the original biometric identifiers, while still allowing the authentication computing device to test the similarity of the obfuscated vectors and authorize access to secured computer resources. In this manner, biometric identifiers can be used to safely and securely authorize access to computer resources without compromising user privacy.

Figure 2A:
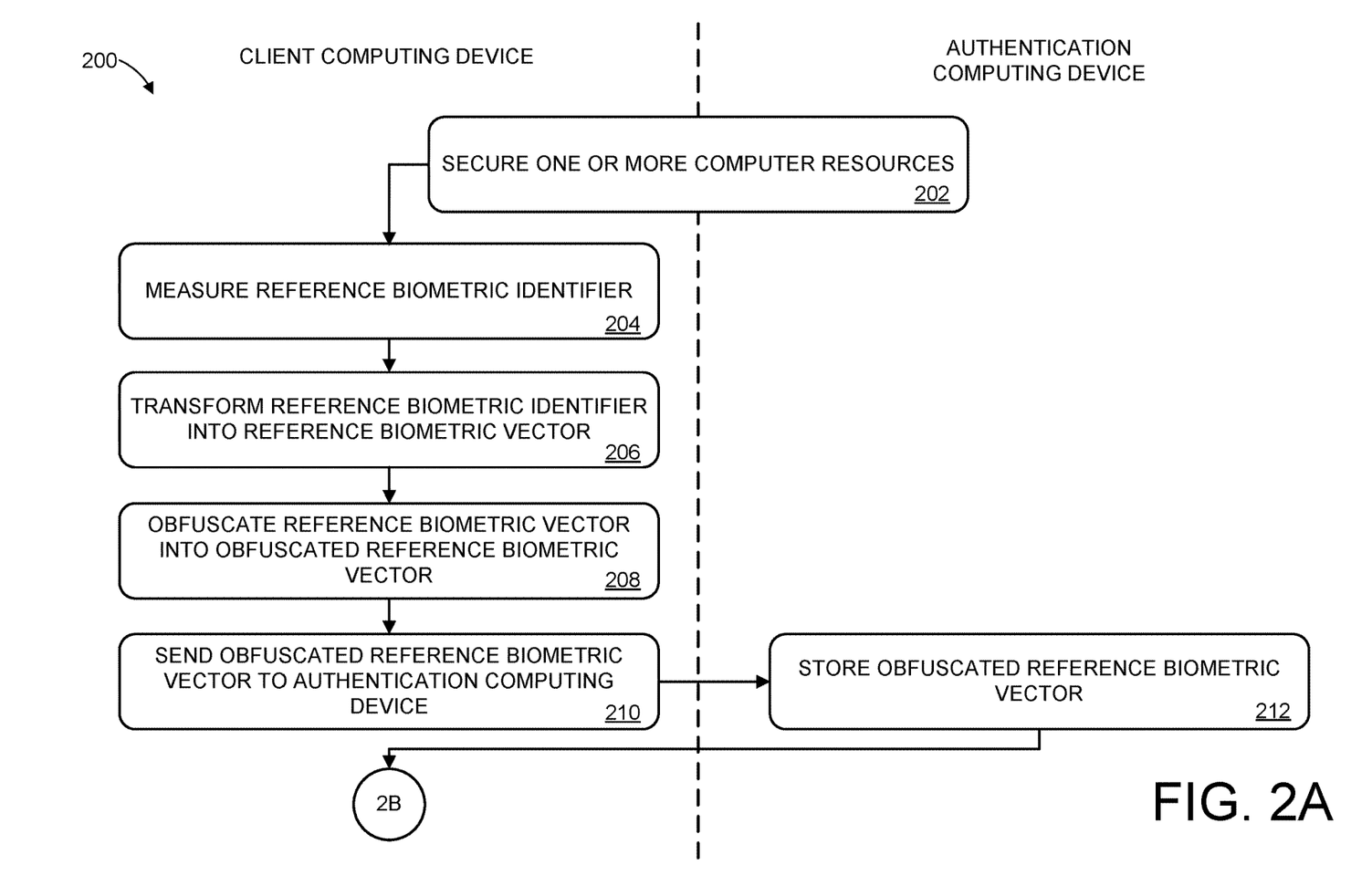
FIGS. 2A-2C illustrate an example method for authorizing access to secured computer resources.
Figure 2B:
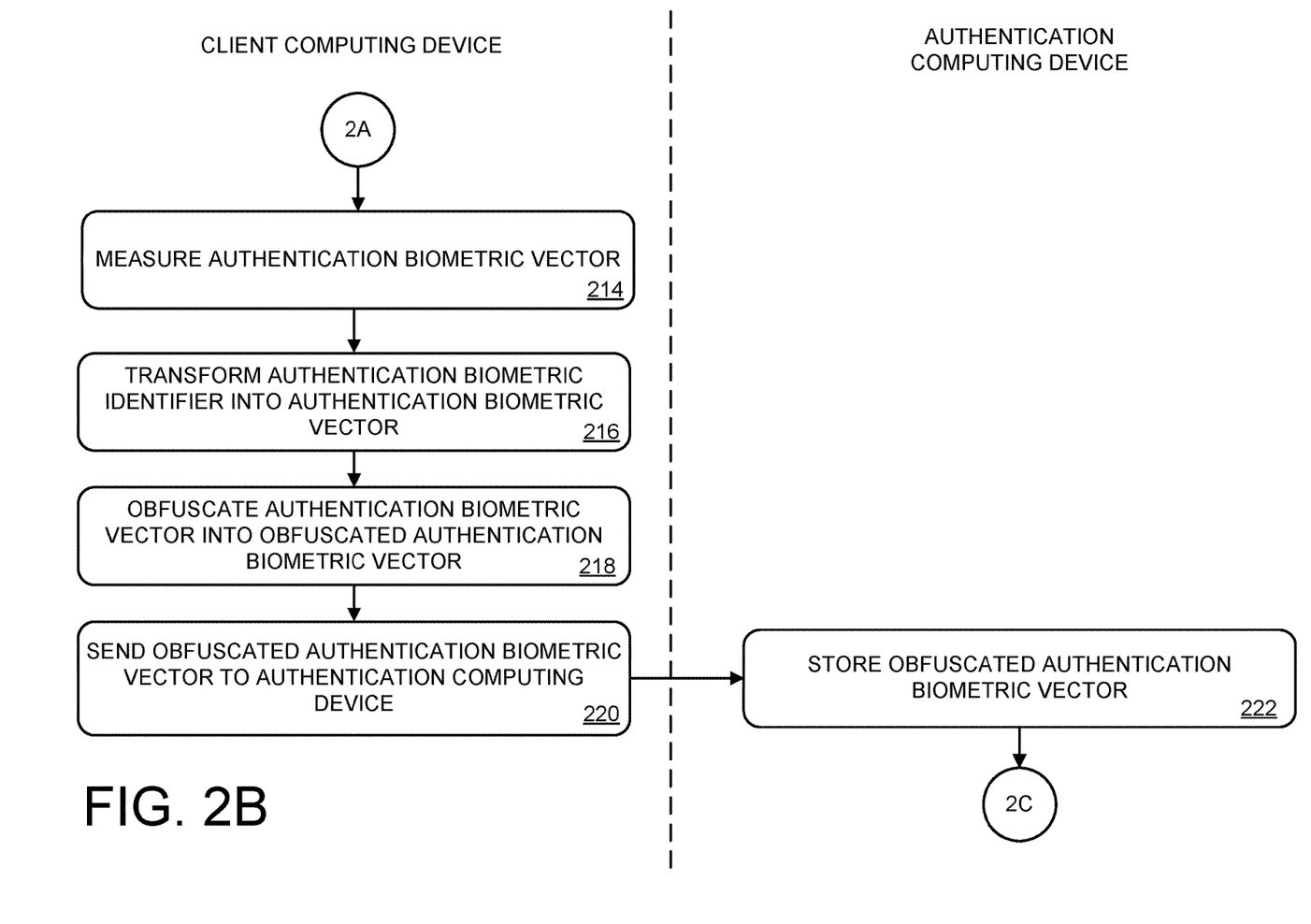
Figure 2C:
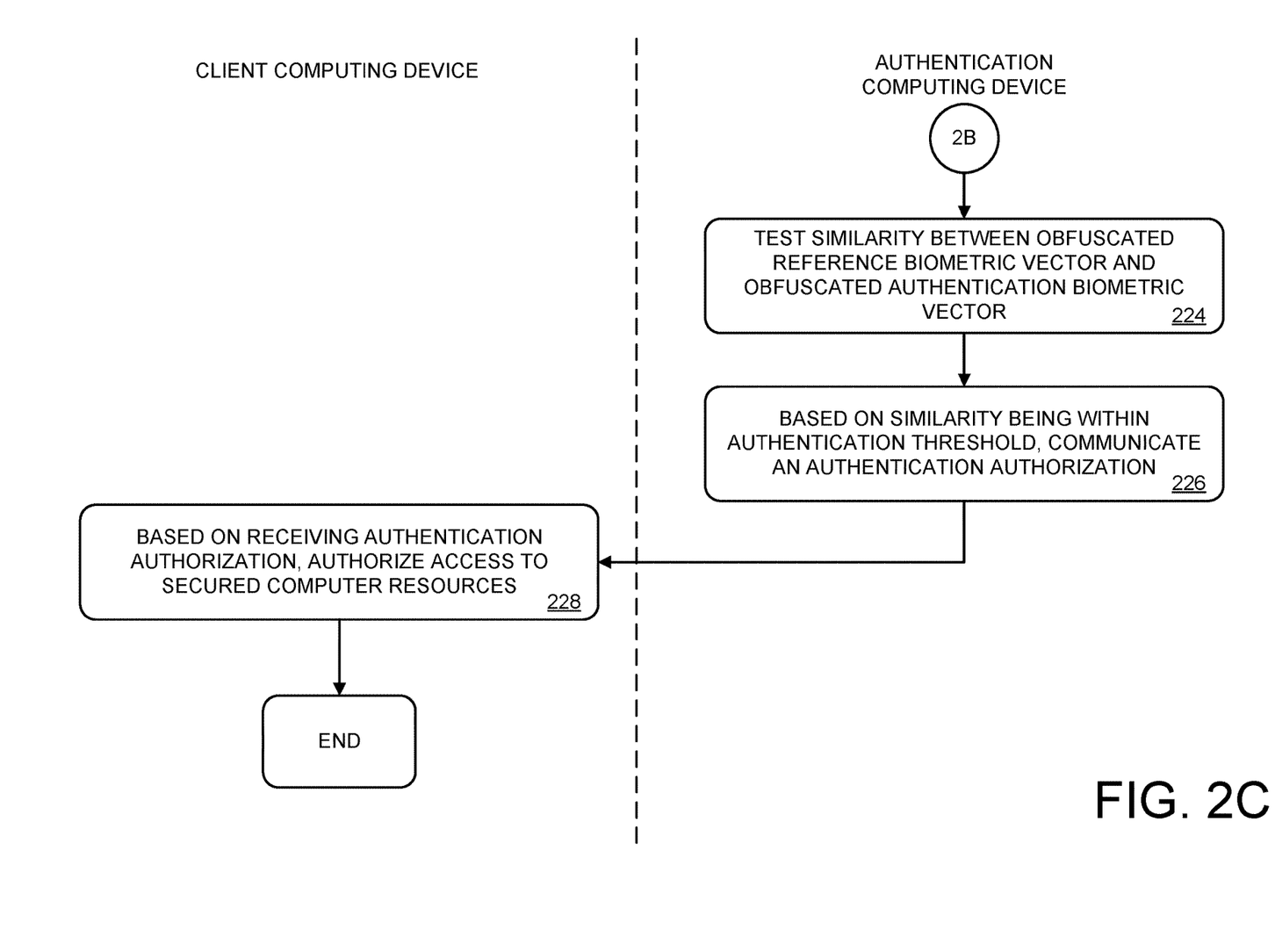

FIGS. 2A-2C illustrate an example method 200 for authorizing access to one or more secured resources. Method 200 may be implemented via any suitable computing devices having any suitable form factors and hardware configurations. As non-limiting examples, either or both of the client computing device and authentication computing device may be desktops, laptops, smartphones, servers, tablets, video game consoles, media centers, fitness devices, vehicle computer systems, or virtual/augmented reality devices. In some examples, either or both of the client computing device and authentication computing device may be implemented as computing system 500 described below with respect to FIG. 5.

Furthermore, while the steps of method 200 are generally divided between two different computing devices—a client computing device and an authentication computing device—this is not limiting. In other examples, steps of method 200 may be performed by more than two different computing devices. Alternatively, steps of method 200 may be performed entirely by a single computing device—e.g., the client computing device. In other words, a single computing device may serve as both the client computing device and the authentication computing device.

Beginning with FIG. 2A, at 202, method 200 includes securing one or more computer resources. Any suitable hardware or software resources of any suitable computing devices may be secured via biometric authorization as discussed herein. Such resources may include physical devices (e.g., processors, sensors, storage devices), computer data (e.g., documents, databases, computer code), user accounts/profiles, software applications, and/or any other securable components, contents, or functions of a computing device. In other words, resources of the client computing device, resources of the authentication computing device, and/or resources of any other suitable computing devices accessible via a computer network may be secured pending successful biometric authentication. This is reflected in FIG. 2A, as step 202 is shown between the client and authentication computing devices to indicate that resources of either, both, or neither device may be secured. Prior to authorization, computing devices may be configured to block user access to the secured computer resources (e.g., not allowing login and/or not allowing decryption of data).

At 204, method 200 includes, at the client computing device, measuring a reference biometric identifier. In some examples, this may be done during a setup or enrollment phase when the computer resources are first secured, and/or when a new user is authorized to access the computer resources pending subsequent biometric authorization. However, a reference biometric identifier may be collected at any suitable time. Furthermore, reference biometric identifiers may in some cases be periodically refreshed or replaced—e.g., to account for changes in a user's appearance or other biometric features over time.

Figure 3:
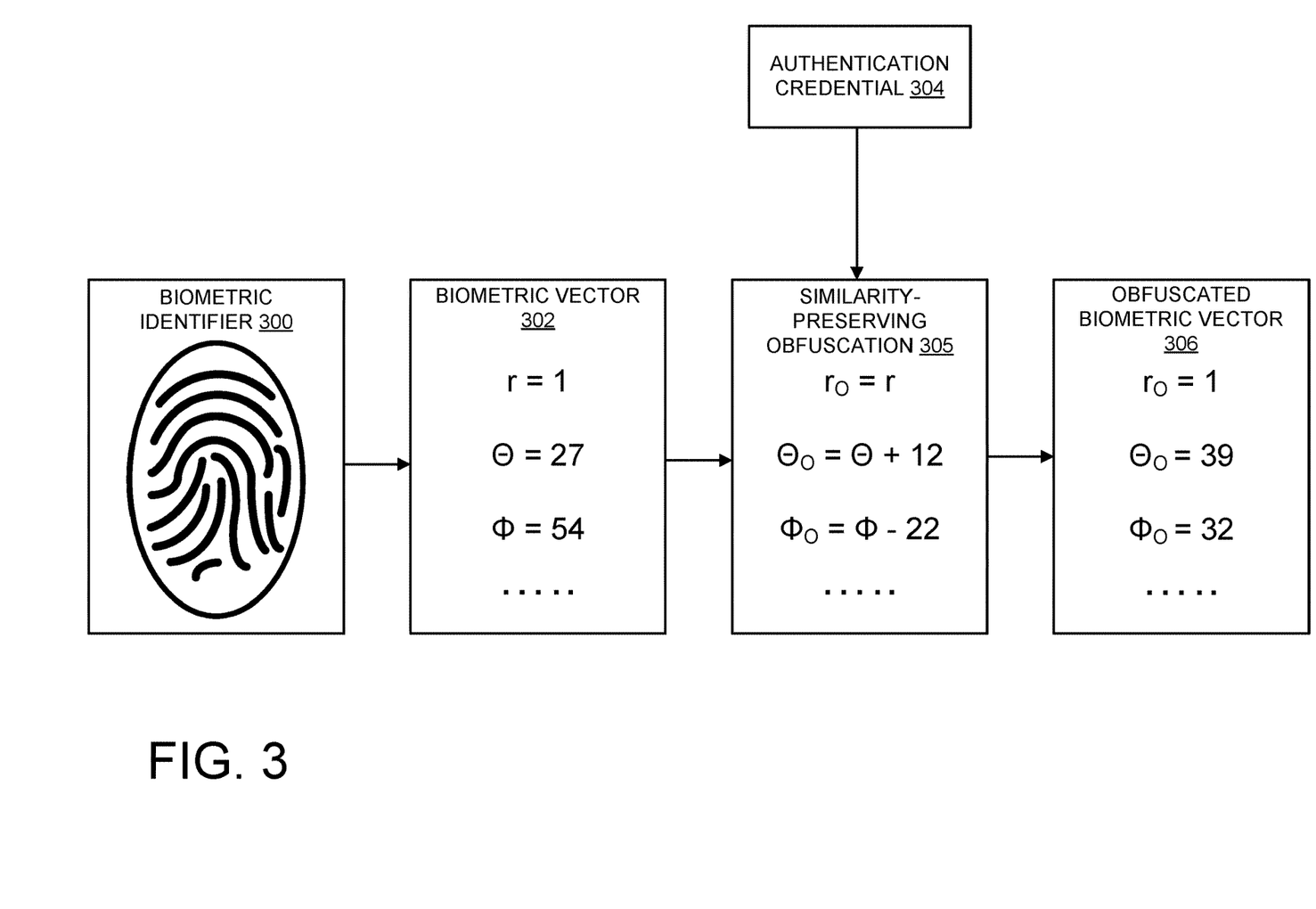
FIG. 3 schematically illustrates transformation of a biometric identifier into a biometric vector, and obfuscation of the biometric vector into an obfuscated biometric vector.

An example biometric identifier 300 is schematically depicted in FIG. 3. Notably, while FIG. 3 is described in the context of the reference biometric identifier, it will be understood that biometric identifier 300 could correspond to either the reference or authentication biometric identifiers. Similarly, the transformations and obfuscations described below with respect to biometric identifier 300 could be applied to either or both of the reference biometric identifier and the authentication biometric identifier.

In this example, the biometric identifier is a fingerprint. However, both reference and authentication biometric identifiers can take any suitable form, and in general will be any type of measurable or quantifiable information pertaining to a user that remains relatively fixed, such that it can later be used to verify the user's identity. As non-limiting examples, suitable biometric identifiers may include a sensed user face, iris, retina, fingerprint, palm print, voice, DNA sequence, or handwriting sample (e.g., signature). Such biometric identifiers may be "sensed" by any suitable biometric sensors in any suitable way. As examples, such sensors may include cameras, scanners, microphones, pressure/touch sensors, or chemical analyzers.

Returning to FIG. 2A, at 206 method 200 includes transforming the reference biometric identifier into a reference biometric vector at the client computing device. This is schematically illustrated in FIG. 3, in which the biometric identifier 300 is transformed into a biometric vector 302. In the illustrated example, the biometric vector 302 is a 3-dimensional vector defined by three values: a magnitude (r), a polar angle ($\Theta$), and an azimuthal ($\Phi$). However, this is only for the sake of simplicity. In practice, a biometric vector may include any number of dimensions—e.g., hundreds, thousands, or millions of dimensions. For the purposes of this disclosure, biometric vectors will be described as having "N" dimensions, where N can be any suitable positive integer.

The manner in which a biometric identifier is transformed into a biometric vector can vary significantly depending on the implementation and the type of biometric identifier measured. The present disclosure is compatible with any vector representation. In cases where the biometric identifier is an image (e.g., of a human face, fingerprint, or iris), different dimensions of the vector optionally may correspond to image pixel values or image features—e.g., edges, corners, blobs—recognized or extracted from an image. In general, any suitable techniques for feature extraction may be used, including edge/corner detection, blob detection/extraction, template matching, etc. In some cases, the vector transformation function may be tuned for specific types of biometric data—e.g., a vector transformation function specifically trained to transform images of human faces into 128-dimensional feature vectors. In other cases, a more generic feature extraction function may be used, such as Speeded-Up Robust Features (SURF), or Scale-Invariant Feature Transform (SIFT).

In cases of non-visual biometric identifiers, other suitable feature extraction techniques may be used. For example, a voice sample may be converted into a feature vector by sampling the voice sample in the time domain to give an amplitude for the audio data at regular intervals. Each individual sample or "slice" of the audio data may then be used to generate values for different dimensions of the feature vector. Alternatively, a frequency-domain representation of the voice sample may be used, in which values for dimensions of the vector may be assigned based on the frequencies and magnitudes of different frequency components present in the audio data.

Regardless of the type of initial biometric identifier and nature of the vector transformation, the reference biometric vector will take the form of a plurality of individual values corresponding to different dimensions of the vector. Such values may have any suitable range—e.g., between 0 and 1, −1 and 1, or 0 and 100. Depending on the implementation, values of a feature vector may in some cases be normalized, compressed, or otherwise modified—e.g., to conserve storage space/network bandwidth, or to mitigate the impact of outliers or signal noise.

Returning to FIG. 2A, at 208, method 200 includes obfuscating the reference biometric vector into an obfuscated reference biometric vector using a similarity-preserving obfuscation. This is also schematically illustrated in FIG. 3, in which biometric vector 302 is obfuscated via a similarity-preserving obfuscation 305 to create obfuscated biometric vector 306. As shown, during the similarity-preserving obfuscation, the polar angle ($\Theta$) and azimuthal ($\Phi$) of the biometric vector are rotated by different values, resulting in an obfuscated polar angle $\Theta_O$ and azimuthal angle $\Phi_O$. The rotations (or other transformations) applied during the similarity-preserving obfuscation may be determined based on the authentication credential 304, as will be discussed in more detail below.

The "similarity-preserving obfuscation" may take the form of any suitable function that can be applied to a biometric vector to modify the information encoded by the biometric vector. Specifically, the similarity-preserving obfuscation modifies the biometric vector in a manner that mitigates or eliminates the possibility that a malicious actor can reproduce the original biometric identifier from the obfuscated biometric vector. Notably, the obfuscation preserves the similarity of two independent vectors both before and after obfuscation.

The similarity-preserving obfuscation may in some cases be a deterministic obfuscation—meaning, the similarity-producing obfuscation will always produce the exact same output for a given input. In other words, for a similarity-preserving obfuscation function E, the similarity $S_1$ of two initial biometric vectors A and B will be equal to the similarity $S_2$ of two obfuscated biometric vectors $A_O$ and $B_O$:

$$S_{1=A, B}$$

$$S_2 = E(A), E(B) = A_O, B_O = S_1$$

Depending on the implementation, the similarity-preserving obfuscation may take a variety of forms. As one example, the similarity-preserving obfuscation may be a deterministic vector rotation. For example, if two biometric vectors each lie on an N-dimensional unit sphere, then the similarity between such vectors may be compared by calculating a cosine angular distance. Thus, the similarity-preserving obfuscation function may be any suitable N-dimensional rotation, which is angle preserving and thus preserves the similarity between the obfuscated vectors. Alternatively, the similarity between two vectors may be determined by calculating an L2 norm. Thus, the similarity-preserving obfuscation may take the form of an N-dimensional Euclidean transformation, under which angles and distances are preserved. Thus, the L2 norm calculated for input vectors A and B will be equal to the L2 norm calculated for obfuscated vectors $A_O$ and $B_O$.

Alternatively, the similarity-preserving obfuscation may preserve the similarity of independent vectors before and after obfuscation without being completely deterministic. In other words, for a given input vector A, the similarity-preserving obfuscation may produce a range of possible output vectors $A_O$, provided that the similarity of two input vectors A and B is substantially the same as the similarity of possible output vectors $A_O$ and $B_O$.

In any case, the exact transformation applied as part of the similarity-preserving obfuscation may be generated in any suitable way. In some cases, the similarity-preserving obfuscation may use a received authentication credential as a seed. This is illustrated in FIG. 3, in which the similarity-preserving obfuscation uses an authentication credential 304 as a seed. For example, the authentication credential may be input as a seed to a random number generator to generate a sequence of rotations or other transformations to be applied to an input biometric vector. By later supplying the same (or substantially similar) authentication credential during obfuscation of a subsequent vector (e.g., an authentication biometric vector), the same (or substantially similar) sequence of rotations or other transformations will be generated, thereby preserving vector similarity.

The authentication credential may take the form of any suitable information or data that remains relatively static, such that it can be consistently reproduced. As examples, the authentication credential may take the form of a user-provided password or PIN, a device identifier (e.g., a MAC address), or a numerical representation of a biometric identifier such as a fingerprint. In cases where a password, PIN, or other credential that may be changed over time is used, changing of such credential may trigger a new obfuscation of the reference biometric vector using the new password/PIN/etc. as the new seed (i.e., redoing step 208 and optionally redoing steps 204 and 206 of FIG. 2A).

Returning to FIG. 2A, at 210, method 200 includes sending the obfuscated reference biometric vector from the client computing device to an authentication computing device. At 212 method 200 includes, at the authentication computing device, storing the obfuscated reference biometric vector previously obfuscated from the reference biometric vector at the client computing device using the similarity-preserving obfuscation. For example, the obfuscated reference biometric vector may be stored as part of a user access credential and/or profile, which the authentication computing device may use when authorizing user access to any restricted computer resource on any cooperating computing device.

The obfuscated reference biometric vector may be sent in any suitable way, over any suitable computer network. In some examples, the obfuscated reference biometric vector may be sent over the Internet. In some implementations, the obfuscated reference biometric vector may be further encrypted for network transmission. Alternatively, as discussed above, steps of method 200 may in some cases be implemented by a single device, in which case the obfuscated reference biometric vector need not be transmitted to the authentication computing device, but rather may be stored by the client computing device for later authentication purposes.

Method 200 continues in FIG. 2B. At 214, method 200 includes measuring an authentication biometric vector at the client computing device. This will occur after the obfuscated reference biometric vector has previously been sent to the authentication computing device. Typically, an authentication biometric vector will be measured when a user attempts to access the one or more secured computer resources, at which time the user will be asked to submit biometric authentication.

The authentication biometric vector may be measured in substantially the same manner as described above with respect to the reference biometric identifier. In other words, the authentication biometric vector may be, as non-limiting examples, a sensed user face, iris, retina, fingerprint, palm print, voice, DNA sequence, or handwriting sample (e.g., signature), and may be sensed by any suitable biometric sensor. In any case, the authentication and reference biometric identifiers will correspond to the same biometric property of the user—i.e., if the reference biometric identifier is a sensed fingerprint, the authentication biometric identifier will be a new measurement of the same fingerprint.

Continuing with FIG. 2B, method 200 includes, at 216, transforming the authentication biometric identifier into an authentication biometric vector. At 218, method 200 includes obfuscating the authentication biometric vector into the obfuscated authentication biometric vector. At 220, method 200 includes sending the obfuscated authentication biometric vector to the authentication computing device. At 222, method 200 includes at least temporarily storing the obfuscated authentication biometric vector at the authentication computing device, the obfuscated authentication biometric vector previously obfuscated from the authentication biometric vector at the client computing device using the similarity-preserving obfuscation. Each of these steps may be performed substantially as discussed above with respect to the reference biometric identifier, reference biometric vector, and obfuscated reference biometric identifier.

Notably, similarity between the reference and authentication biometric vectors will be preserved only if the same authentication credential is supplied for both vectors during the similarity-preserving obfuscation. Thus, even if a malicious actor is able to supply an authentication biometric identifier that is similar or identical to an approved user's actual biometric identifier, the malicious actor will not be able to access the secured computer resources unless the authentication credential is also known.

Figure 4:
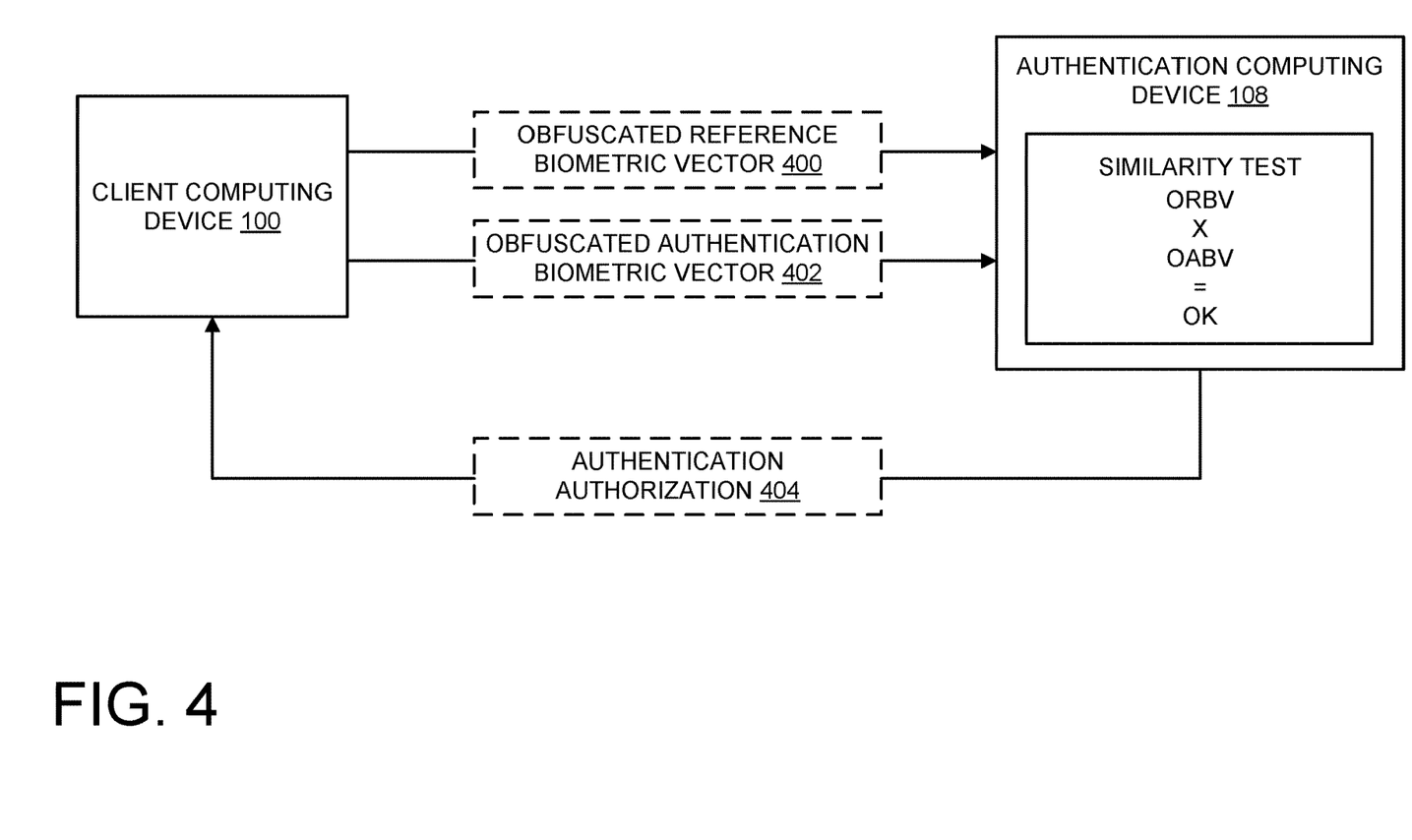
FIG. 4 schematically illustrates testing the similarity of an obfuscated reference biometric vector and an obfuscated authentication biometric vector received from a client computing device.

Method 200 continues in FIG. 2C. At 224, method 200 includes testing the similarity between the obfuscated reference biometric vector and obfuscated authentication biometric vector. This is schematically shown in FIG. 4. As shown, client computing device 100 sends an obfuscated reference biometric vector 400 and an obfuscated authentication biometric vector 402 to authentication computing device 108. Notably, any length of time may pass between sending of the two obfuscated vectors—i.e., the obfuscated authentication biometric vector may be sent seconds, minutes, hours, days, weeks, or years after the obfuscated reference biometric vector. Once both obfuscated vectors are received by the authentication computing device, the authentication computing device tests the similarity between the two vectors.

As discussed above, the similarity of two obfuscated vectors may be tested in any suitable way. As one non-limiting example, when the similarity-preserving obfuscation is a vector rotation, testing the similarity of the obfuscated vectors may include calculating the cosine angular distance of the two vectors. Alternatively, when the similarity-preserving obfuscation is a Euclidean transformation, testing the similarity between the obfuscated vectors may include calculating the L2 norm between the two vectors. In general, any suitable method for comparing the similarity of two vectors may be used.

Returning to FIG. 2C, at 226, method 200 includes communicating an authentication authorization to the client computing device based on the similarity being within an authentication threshold. This is also illustrated in FIG. 4 in which, after the authentication computing device 108 conducts the similarity test, an authentication authorization 404 is sent to the client computing device.

Any suitable authentication threshold may be used for determining whether access to the secured computer resources should be authorized. As one non-limiting example, a 99% confidence interval may be used. In general, the higher the authentication threshold, the more secure the computer resources will be, while also increasing the risk of potential false negatives. Depending on the implementation, system security may be balanced against ease-of-use to arrive at a desirable threshold. Different authentication thresholds may be set depending on the type of biometric identifiers collected. For example, images of a user's face may exhibit noise due to lighting conditions, eyeglasses, facial hair, etc., and thus benefit from a relatively lower authentication threshold as compared to other biometric identifiers that are less susceptible to noise, such as fingerprints. Furthermore, in some examples, different authentication thresholds may be set for different secured resources—e.g., relatively higher authentication thresholds may be used for relatively more sensitive resources.

Furthermore, the present disclosure has thus far assumed that the obfuscated authentication biometric vector will be compared to only one obfuscated reference biometric vector stored at the authentication computing device. However, in practice, the authentication computing device may store any number of different obfuscated reference biometric vectors, and the obfuscated authentication biometric vector may be compared to any or all of the stored reference vectors. For example, one obfuscated reference biometric vector may correspond to an image of a user's face while the user is wearing glasses, while a different obfuscated reference biometric vector may correspond to a different image where the user is not wearing glasses. The authentication computing device may optionally receive and store multiple obfuscated reference biometric vectors corresponding to multiple different types of biometric identifiers—e.g., one or more vectors may correspond to images of a user's face, while one or more other vectors may correspond to the user's fingerprint(s).

In cases where multiple obfuscated reference biometric vectors are stored, the authentication authorization may be transmitted if the obfuscated authentication biometric vector passes a similarity test with any of the stored obfuscated reference biometric vectors. In other words, the obfuscated authentication biometric vector may be tested against each of the stored obfuscated reference biometric vectors separately, and if even a single pair of vectors matches within the authentication threshold, access to the secured resources may be authorized. Alternatively, access to the secured computer resources may only be authorized if the obfuscated authentication biometric vector matches more than one stored obfuscated reference biometric vector within an authentication threshold.

The authentication authorization may take any suitable form. As one example, the authentication authorization may take the form of a decryption key. Furthermore, in some cases, the authentication authorization may include other suitable information—e.g., a confidence interval that the obfuscated authentication biometric vector matches the obfuscated reference biometric vector, or a manifest indicating which specific secured resources are being made available.

Returning to FIG. 2C, at 228 method 200 includes, at the client computing device, authorizing access to the secured computer resources based on receiving the authentication authorization. Conversely, if the authentication computing device reports that access is not authorized, the client computing device may prompt the user to provide a new authentication biometric identifier, utilize a different method for verifying user identity, request assistance from an owner or administrator of the secured computer resources, or simply refuse to grant access to the secured computer resources.

In some cases, the authentication authorization may eventually expire, such that access to the secured computer resources is be limited to a single session, or a fixed time limit. Thus, once the authentication authorization has expired, the computer resources may again be secured until the biometric authentication process has been successfully repeated. Thus, method 200 may return to step 214, or another suitable step, before the secured computer resources can again be unlocked.

Additionally, or alternatively, the obfuscated reference biometric vector stored by the authentication computing device may expire, such that a new reference biometric identifier must be collected before the secured computer resources can be accessed. Thus, method 200 may return to step 202, or another suitable step, to submit a new obfuscated reference biometric vector to the authentication computing device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
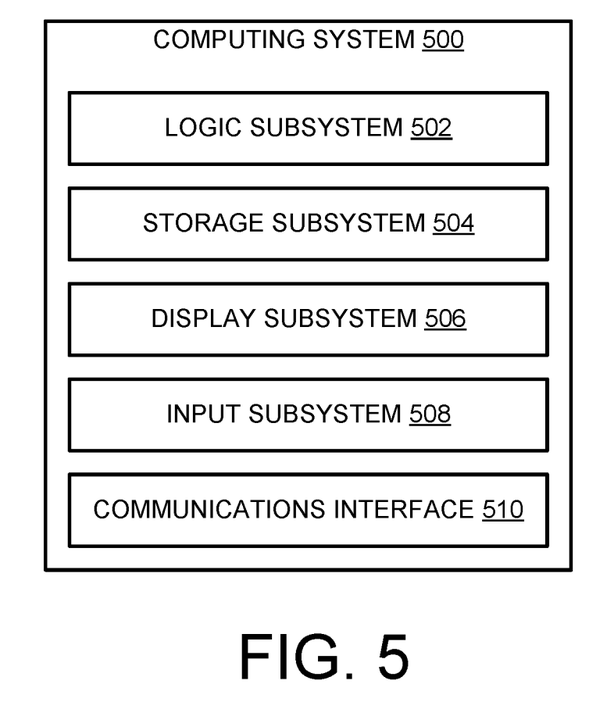
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Furthermore, the input subsystem 508 may include any sensors capable of collecting biometric identifiers as discussed above—e.g., cameras, scanners, pressure sensors, or chemical analyzers.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate machine learning (ML) and/or artificial intelligence (AI) components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for authorizing access to one or more secured computer resources comprises: storing an obfuscated reference biometric vector at an authentication computing device, the obfuscated reference biometric vector previously obfuscated from a reference biometric vector using a similarity-preserving obfuscation at a client computing device; receiving an obfuscated authentication biometric vector, the obfuscated authentication biometric vector previously obfuscated from an authentication biometric vector using the similarity-preserving obfuscation at the client computing device; testing a similarity of the obfuscated reference biometric vector and the obfuscated authentication biometric vector at the authentication computing device; and based on the similarity being within an authentication threshold, communicating an authentication authorization from the authentication computing device to the client computing device to grant access to the one or more secured computer resources. In this example or any other example, the similarity-preserving obfuscation is a deterministic obfuscation. In this example or any other example, the similarity-preserving obfuscation is a deterministic vector rotation. In this example or any other example, testing the similarity of the obfuscated reference biometric vector and the obfuscated authentication biometric vector includes calculating a cosine angular distance between the obfuscated reference biometric vector and the obfuscated authentication biometric vector. In this example or any other example, the similarity-preserving obfuscation is a deterministic Euclidean transformation. In this example or any other example, testing the similarity of the obfuscated reference biometric vector and the obfuscated authentication biometric vector includes calculating an L2 norm between the obfuscated reference biometric vector and the obfuscated authentication biometric vector. In this example or any other example, the similarity-preserving obfuscation uses a received authentication credential as a seed. In this example or any other example, the received authentication credential is a password. In this example or any other example, the received authentication credential is a device identifier. In this example or any other example, the received authentication credential is a biometric identifier.

In an example, a method of granting access to one or more secured computer resources comprises: obfuscating a reference biometric vector into an obfuscated reference biometric vector using a similarity-preserving obfuscation at a client computing device; sending the obfuscated reference biometric vector from the client computing device to an authentication computing device; measuring an authentication biometric identifier at the client computing device; transforming the biometric identifier into an authentication biometric vector at the client computing device; obfuscating the authentication biometric vector into an obfuscated authentication biometric vector using the similarity-preserving obfuscation at the client computing device; sending the obfuscated authentication biometric vector from the client computing device to the authentication computing device; and based on receiving an authentication authorization from the authentication computing device, granting access to the one or more secured computer resources, the authentication authorization previously determined at the authentication computing device based on a similarity of the obfuscated reference biometric vector and the obfuscated authentication biometric vector being within an authentication threshold. In this example or any other example, the reference biometric vector is transformed from a reference biometric identifier measured at the client computing device. In this example or any other example, the similarity-preserving obfuscation is deterministic vector rotation. In this example or any other example, the similarity-preserving obfuscation is a deterministic Euclidean transformation. In this example or any other example, the similarity-preserving obfuscation uses a received authentication credential as a seed. In this example or any other example, the authentication biometric identifier is a sensed human fingerprint. In this example or any other example, the authentication biometric identifier is a sensed human iris. In this example or any other example, the authentication biometric identifier is a sensed human face. In this example or any other example, the authentication biometric identifier is a sensed human voice.

In an example, a method of authorizing access to one or more secured computer resources comprises: obfuscating a reference biometric vector into an obfuscated reference biometric vector using a similarity-preserving obfuscation; obfuscating an authentication biometric vector into an obfuscated authentication biometric vector using the similarity-preserving obfuscation; testing a similarity of the obfuscated authentication biometric vector and the obfuscated reference biometric vector; and based on the similarity being within an authentication threshold, authorizing access to the one or more secured computer resources.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for authorizing access to one or more secured computer resources, the method comprising:
storing an obfuscated reference biometric vector at an authentication computing device, the obfuscated reference biometric vector previously obfuscated from a reference biometric vector using a similarity-preserving obfuscation at a client computing device, wherein the reference biometric vector includes N dimensions, wherein the similarity-preserving obfuscation is a deterministic vector rotation in which a sequence of rotations is applied relative to one or more of the N dimensions, and wherein the sequence of rotations is generated based on a seed value;
receiving an obfuscated authentication biometric vector, the obfuscated authentication biometric vector previously obfuscated from an authentication biometric vector using the similarity-preserving obfuscation at the client computing device;
testing a similarity of the obfuscated reference biometric vector and the obfuscated authentication biometric vector at the authentication computing device; and
based on the similarity being within an authentication threshold, communicating an authentication authorization from the authentication computing device to the client computing device to grant access to the one or more secured computer resources,
wherein the similarity-preserving obfuscation uses a received authentication credential as the seed value for a random number generator to generate the sequence of rotations.

2. The method of claim 1, wherein testing the similarity of the obfuscated reference biometric vector and the obfuscated authentication biometric vector includes calculating a cosine angular distance between the obfuscated reference biometric vector and the obfuscated authentication biometric vector.

3. The method of claim 1, wherein testing the similarity of the obfuscated reference biometric vector and the obfuscated authentication biometric vector includes calculating an L2 norm between the obfuscated reference biometric vector and the obfuscated authentication biometric vector.

4. The method of claim 1, wherein the received authentication credential is a password.

5. The method of claim 1, wherein the received authentication credential is a device identifier.

6. The method of claim 1, wherein the received authentication credential is a biometric identifier.

7. A method of granting access to one or more secured computer resources, the method comprising:
obfuscating a reference biometric vector into an obfuscated reference biometric vector using a similarity-preserving obfuscation at a client computing device, wherein the reference biometric vector includes N dimensions, wherein the similarity-preserving obfuscation is a deterministic vector rotation in which a sequence of rotations is applied relative to one or more of the N dimensions, and wherein the sequence of rotations is generated based on a seed value;
sending the obfuscated reference biometric vector from the client computing device to an authentication computing device;
measuring an authentication biometric identifier at the client computing device;
transforming the authentication biometric identifier into an authentication biometric vector at the client computing device;
obfuscating the authentication biometric vector into an obfuscated authentication biometric vector using the similarity-preserving obfuscation at the client computing device;
sending the obfuscated authentication biometric vector from the client computing device to the authentication computing device; and
based on receiving an authentication authorization from the authentication computing device, granting access to the one or more secured computer resources, the authentication authorization previously determined at the authentication computing device based on a similarity of the obfuscated reference biometric vector and the obfuscated authentication biometric vector being within an authentication threshold,
wherein the similarity-preserving obfuscation uses a received authentication credential as the seed value for a random number generator to generate the sequence of rotations.

8. The method of claim 7, wherein the reference biometric vector is transformed from a reference biometric identifier measured at the client computing device.

9. The method of claim 7, wherein the authentication biometric identifier is a sensed human fingerprint.

10. The method of claim 7, wherein the authentication biometric identifier is a sensed human iris.

11. The method of claim 7, wherein the authentication biometric identifier is a sensed human face.

12. The method of claim 7, wherein the authentication biometric identifier is a sensed human voice.

13. A method of authorizing access to one or more secured computer resources, the method comprising:
- obfuscating a reference biometric vector into an obfuscated reference biometric vector using a similarity-preserving obfuscation, wherein the reference biometric vector includes N dimensions, wherein the similarity-preserving obfuscation is a deterministic vector rotation in which a sequence of rotations is applied relative to one or more of the N dimensions, and wherein the sequence of rotations is generated based on a seed value;
- obfuscating an authentication biometric vector into an obfuscated authentication biometric vector using the similarity-preserving obfuscation;
- testing a similarity of the obfuscated authentication biometric vector and the obfuscated reference biometric vector; and
- based on the similarity being within an authentication threshold, authorizing access to the one or more secured computer resources,
- wherein the similarity-preserving obfuscation uses a received authentication credential as the seed value for a random number generator to generate the sequence of rotations.

* * * * *